(12) United States Patent
Abe (10) Patent No.: US 6,634,186 B2
(45) Date of Patent: Oct. 21, 2003

(54) PROCESS FOR CUTTING A GLASS SHEET AND A GLASS DISK FOR A RECORDING MEDIUM

(75) Inventor: Koichi Abe, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/923,722

(22) Filed: Aug. 7, 2001

(65) Prior Publication Data

US 2002/0041946 A1 Apr. 11, 2002

(30) Foreign Application Priority Data

Aug. 18, 2000 (JP) .......................................... 2000-248479

(51) Int. Cl.⁷ .......................... C03B 33/023; C03B 21/02
(52) U.S. Cl. .............................. 65/105; 65/166; 65/174; 65/175; 65/61; 216/94; 216/108; 216/109
(58) Field of Search ........................ 65/105, 166, 174, 65/175, 61; 216/94, 108, 109

(56) References Cited

U.S. PATENT DOCUMENTS

| 3,453,097 A | * | 7/1969 | Hafner ......................... 65/174 |
| 4,999,083 A | * | 3/1991 | Watanabe et al. |
| 5,138,131 A | * | 8/1992 | Nishikawa et al. ............ 65/174 |
| 5,809,006 A | * | 9/1998 | Davis et al. |
| 6,327,875 B1 | * | 12/2001 | Allaire et al. .................. 65/105 |

FOREIGN PATENT DOCUMENTS

| JP | 63-40734 | * | 2/1988 | .................. 65/105 |
| JP | 2-30390 | * | 1/1990 | .................. 65/105 |
| WO | 93/20015 | | 10/1993 | |

* cited by examiner

Primary Examiner—Michael Colaianni
(74) Attorney, Agent, or Firm—Merchant & Gould, P.C.

(57) ABSTRACT

A U-shaped groove is formed in a glass sheet along a cutting line and the sheet is cut by breaking along the groove. The groove is formed by heating a sheet portion including the cutting line by a laser beam, cooling it to lower its density, and etching that portion to dissolve it. Every surface exposed by cutting the sheet has a pair of edges which are properly beveled and rounded.

15 Claims, 9 Drawing Sheets

PROCESS FOR CUTTING A GLASS SHEET AND A GLASS DISK FOR A RECORDING MEDIUM

BACKGROUND OF THE INVENTION

1. Field of the Invention

This invention relates to a process for the precision cutting of a glass sheet and to a glass disk used for making a recording medium.

2. Description of the Related Art

There is known a method in which a glass sheet is marked with scratch lines by a glass cutter having an ultrahard alloy roll and is broken or severed along those lines to produce a glass sheet having a desired size. This method is called "mechanical scribing". It is, however, known that mechanical scribing leaves oval shell-shaped chips discontinuously along the scratch lines and forms dust of glass scattering and adhering to the product surfaces. The shell-shaped chips are undesirable as they make a product of very low quality. The dust adheres to the product so strongly as not to be removable by pickling or any other way of cleaning, and requires a high cost of after-treatment. The method is basically carried out manually and is, therefore, low in productivity. Thus, it is a method which is not suitable for precision cutting, or mass production.

A method of cutting glass on a mass-production basis is proposed in WO93/20015 entitled "SPLITTING OF NON-METALLIC MATERIALS". In the proposed method, a glass surface is marked with scratches, and heated by a laser beam so that a large amount of thermal stress may be produced therein. The glass is broken or severed if its thermal stress exceeds its breaking stress. The method is high in productivity, since it requires only small scratches to be made on glass and can be carried out automatically. The smaller the scratches, however, the sharper right-angled edges are formed between the glass surfaces and the broken or cut surfaces. They are dangerous for handling and require beveling. Moreover, the cut surfaces are not satisfactory in accuracy.

SUMMARY OF THE INVENTION

It is an object of this invention to provide a process which enables the highly accurate cutting of a glass sheet, while maintaining productivity.

According to a first aspect of this invention, there is provided a process for cutting a glass sheet, which comprises the steps of heat treating a glass sheet to be cut by applying at least one laser beam onto its surface and scanning the beam along a cutting line along which the sheet is to be cut, so that a sheet portion including the cutting line may be heated to a temperature equal to, or above its glass transition point, and then cooled to have a specific volume which is larger than that of the remaining portion; etching the heat-treated sheet to form a groove along the cutting line; and breaking the sheet along the groove.

A sheet portion including a cutting line is lowered in density by heat treatment and the lower-density portion is dissolved by etching to form a U-shaped groove along which the sheet is to be broken. Thus, the process of this invention ensures a by far more accurate finish than any known method relying upon mechanical scribing or thermal strain cutting. No shell-shaped chip, or horn-shaped projection is formed by the process of this invention, insofar as it employs etching instead of mechanical scoring. The dissolving action of an etching solution makes properly beveled edges on the broken surfaces and eliminates the necessity for any beveling job.

The temperature to which the sheet is heated is preferably lower than the dissolving temperature of glass, so that the sheet may not be affected adversely in flatness or shape. Two laser beams facing each other are preferably employed for heating both sides of the sheet simultaneously, so that two U-shaped grooves may be formed on the opposite side of the sheet from each other to make its cutting much easier. The cut edges are advantageously beveled on both sides of the sheet.

The cooling of the sheet is preferably carried out forcibly immediately after its heating, so that a high cooling rate may bring about an accelerated reduction in density which makes it possible to form a deeper U-shaped groove and thereby facilitate cutting. Any gas or liquid, or any gas-liquid mixture can be used as a coolant. Air is, however, preferred as a coolant for forced cooling, since it is inexpensive, does not have to be collected after use, is easy to handle and requires only a small apparatus. Any other gas, such as carbon dioxide, nitrogen or argon, requires a gas bottle, while a liquid coolant, such as water or oil, requires a pump and a collection tank, and in either event, the coolant requires a more expensive apparatus.

The groove preferably has a depth of at least 50 microns. It has been found experimentally that a groove having a smaller depth results in the failure of a glass sheet to be broken across its thickness or along the groove.

An aqueous solution of acid ammonium fluoride is preferably used for etching. Acid ammonium fluoride is suitable for use in forming a U-shaped groove because of its action of dissolving glass. An aqueous solution of acid ammonium fluoride obtained by mixing sulfuric acid with ammonium fluoride has a milder dissolving action and is, therefore, suitable for use in beveling the edges.

The sheet preferably has a linear expansion coefficient of $35 \times 10^{-7}$/deg. C or higher in a temperature range of 0 to 350 deg. C, since a higher coefficient brings about a greater specific volume.

The cutting line is preferably a closed curve having an ending point coinciding with its starting point. This invention is useful for cutting a glass sheet along either a straight line or a curved line, but is particularly useful for making a product by cutting a glass sheet along a closed curve, since a beautiful closed curve can be drawn by a single stroke of a laser beam if its position is numerically controlled. A true circle is, for example, a closed curve. Every glass disk cut out along a true circle from a large glass sheet is expected to have a very high accuracy of roundness. Thus, it is possible to produce disks of glass having a very high dimensional accuracy on a mass-production basis.

The laser beam is preferably inclined to a line normal to the surface of the sheet so that the groove may have a conical or likewise tapered surface. The conical or tapered surface facilitates the separation of any product from a large glass sheet and enables it to be separated without making any undesirable contact with the sheet, or base material and maintain its good quality without having any damaged or chipped edge portion.

According to a second aspect of this invention, there is provided a glass disk for a recording medium, the disk having an inner periphery and an outer periphery each in the form of a true circle, and being of glass having a linear expansion coefficient of $35 \times 10^{-7}$/deg. C or higher in a temperature range of 0 to 350 deg. C, each principal surface of the disk and each of its inner and outer peripheral surfaces having therebetween a corner formed by a part of a groove formed by applying a laser beam to the surface of a glass sheet before cutting out the disk therefrom, cooling the sheet and etching it with a solution containing fluorine.

Glass having a linear expansion coefficient as stated above permits the formation of satisfactorily deep U-shaped grooves along cutting lines by laser beam application, cooling and etching. The deep grooves facilitate the separation of the glass disk from the sheet. Each cut surface defining the inner or outer periphery of the disk has a pair of corners each formed by a beveled edge of a U-shaped groove. The positioning of the laser beam can be numerically controlled so that each of the inner and outer peripheries of the disk may have a high accuracy of roundness with a deviation in the order of only several microns. Thus, the disk of this invention is suitable for a recording medium owing to its high roundness and its beveled corners.

BRIEF DESCRIPTION OF THE DRAWINGS

Several preferred embodiments of the present invention will be described in detail below, byway of example only, with reference to the accompanying drawings, in which.

DETAILED DESCRIPTION OF THE PREFERRED EMBODIMENTS

Figure 1:
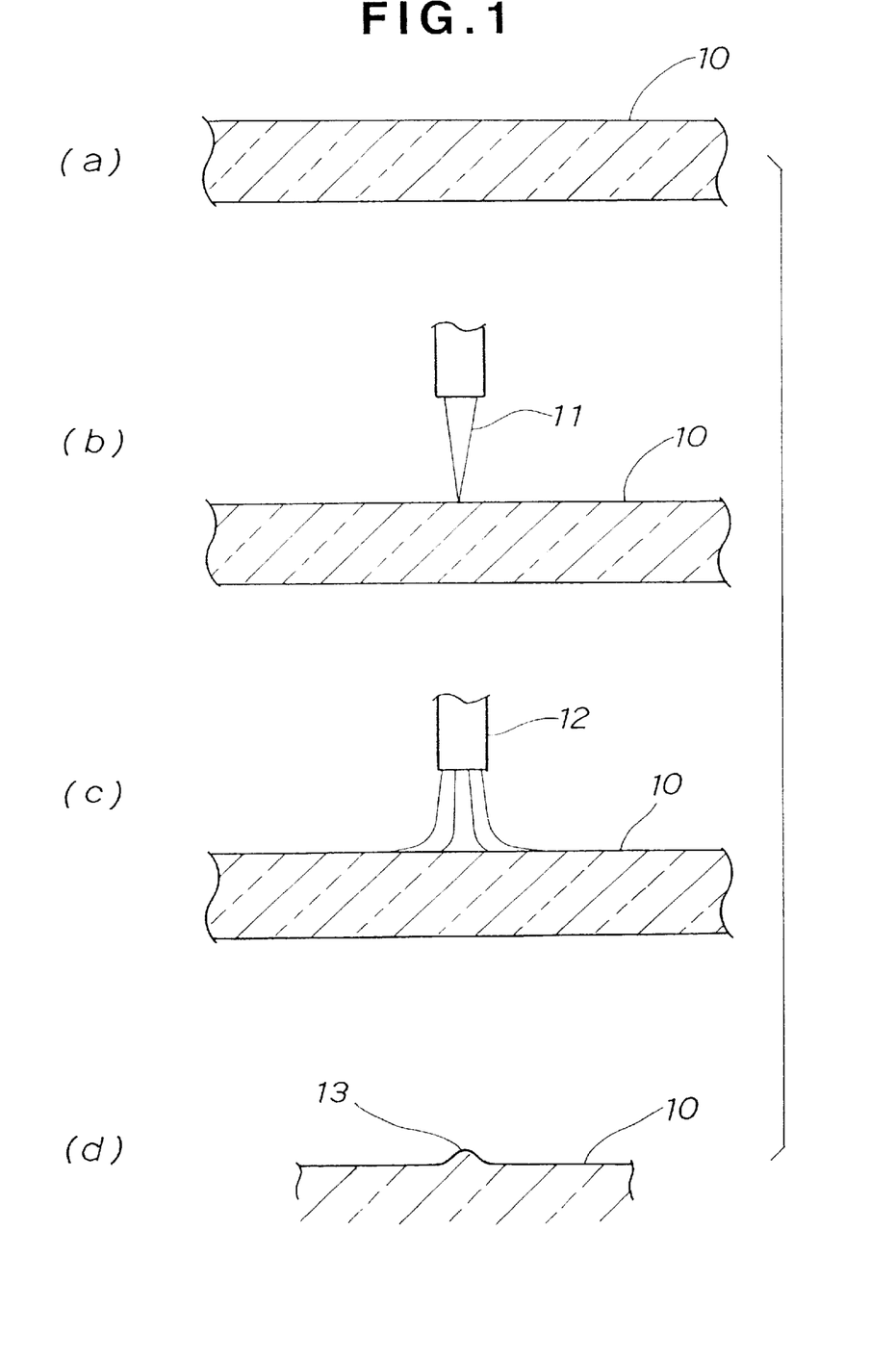
FIG. 1 is a diagrammatic illustration of the step of heat treating a glass sheet in a process embodying the invention.

Referring first to (a) to (d) of FIG. 1, a glass sheet 10 is prepared as shown in (a) of FIG. 1. The sheet 10 may be of silicate glass, or more specifically aluminosilicate, aluminoborosilicate, borosilicate or soda lime silicate glass, or alkali-containing reinforced glass. The glass preferably has a linear expansion coefficient of at least $35 \times 10^{-7}$/deg. C, and more preferably at least $70 \times 10^{-7}$/deg. C to ensure that its laser beam heating, air cooling and etching be effectively carried out. For example, reinforced glass consisting mainly of 55 to 70% by weight of silica ($SiO_2$), 10 to 20% by weight of alumina ($Al_2O_3$), 5 to 15% by weight of $Na_2O$ and 2 to 8% by weight of $Li_2O$, which is easy to reinforce by chemical treatment, has a linear expansion coefficient of about $90 \times 10^{-7}$/deg. C, and has been found to allow a U-shaped groove to be easily formed in a sheet thereof.

Soda lime silicate glass, which is widely used for windowpanes in buildings, also has a linear expansion coefficient of about $90 \times 10^{-7}$/deg. C, and has been found to allow a U-shaped groove to be easily formed in a sheet thereof. Good results have also been obtained from glass for display having a linear expansion coefficient of $(80 \text{ to } 89) \times 10^{-7}$/deg. C and containing, for example, 50 to 65% by weight of $SiO_2$, 5 to 15% by weight of $Al_2O_3$, 5 to 15% by weight of $ZrO_2$, a total of 10 to 25% by weight of divalent metal oxides (MgO, CaO, SrO, BaO and ZnO) and a total of 8 to 15% by weight of alkali metal oxides ($Na_2O$ and $K_2O$) when a sheet thereof was formed with a U-shaped groove and broken along it. The process of this invention is also suitable for application to alkaliless glass for a TFT liquid crystal display having a linear expansion coefficient of $(35 \text{ to } 50) \times 10^{-7}$/deg. C and not substantially containing any alkali, for example, aluminoborosilicate glass consisting essentially of 45 to 60% by weight of $SiO_2$, 5 to 15% by weight of $Al_2O_3$ and 5 to 15% by weight of $B_2O_3$.

Referring to (b) of FIG. 1, a laser beam 11 is applied to the surface of the sheet 10, and scanned along a cutting line to heat a sheet portion including the cutting line to a temperature equal to, or above its glass transition point. The sheet may break by strain if it is heated too rapidly. It is, therefore, suggested that the power of the laser, the diameter of the beam and its scanning speed be selected to suit the composition of glass, so that the sheet may not break by strain.

Then, air is jetted out through an air nozzle 12 for the forced cooling of the heated sheet portion, as shown in (c) of FIG. 1. The portion 13 which has been heated and cooled protrudes slightly from the remaining portion, as shown in (d) of FIG. 1. This phenomenon will be explained with reference to FIG. 2.

Figure 2:
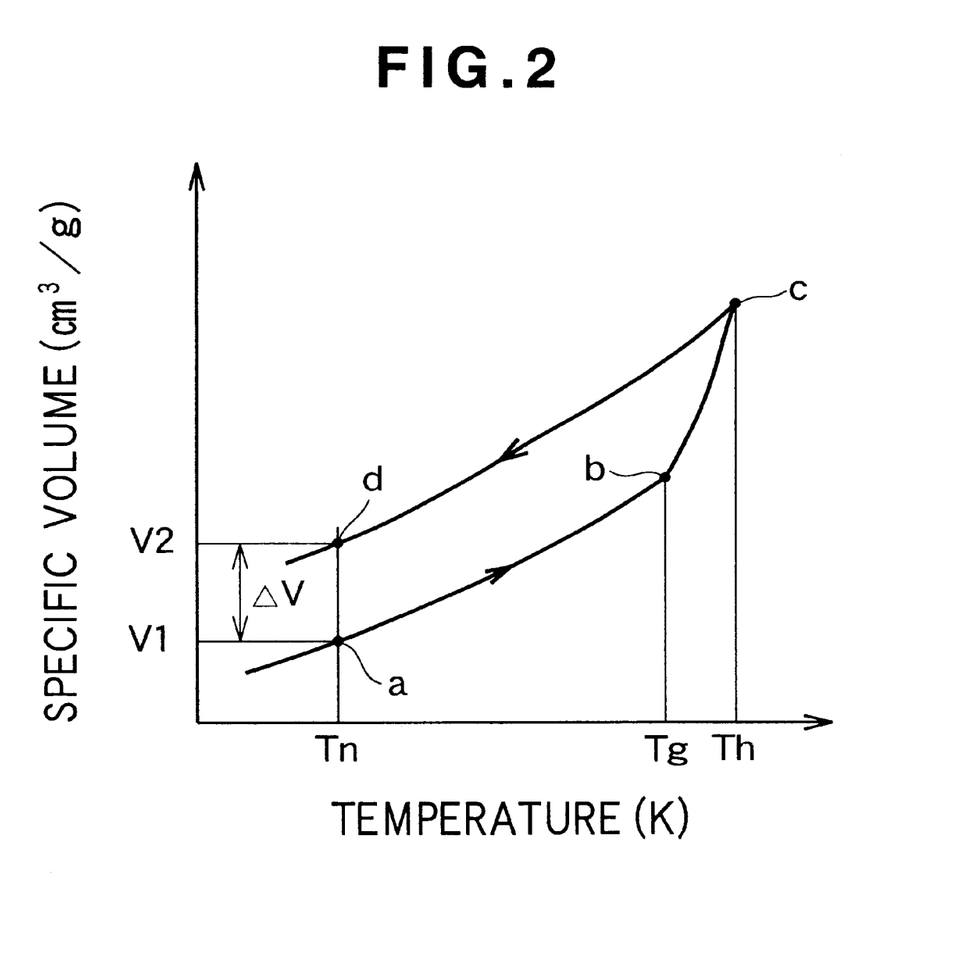
FIG. 2 is a graph showing the specific volume of glass in relation to the temperature to which it is heated.

In FIG. 2, the x-axis indicates the temperature of glass, while the y-axis indicates its specific volume (or the reciprocal of its density), and Tn stands for normal room temperature, Tg stands for transition temperature and Th stands for a temperature which is higher than Tg, but lower than the melting point. If a glass sheet staying at normal room temperature is heated from a point a in the graph, its specific volume gradually increases and if its temperature exceeds a point b corresponding to the transition temperature Tg, its specific volume shows a sharp increase. If its heating is discontinued at a point c and is followed immediately by forced cooling, it goes to a point d without returning to the point b or a. Its specific volume V1 at the point a is smaller than its specific volume V2 at the point d and at the point d, its density is lower by ÂV (V2−V1) and it expands accordingly. In other words, the heat-treated portion of glass has a slightly coarser structure than the remaining portion, and slightly protrudes as shown at 13 in (d) of FIG. 1.

Figure 3:
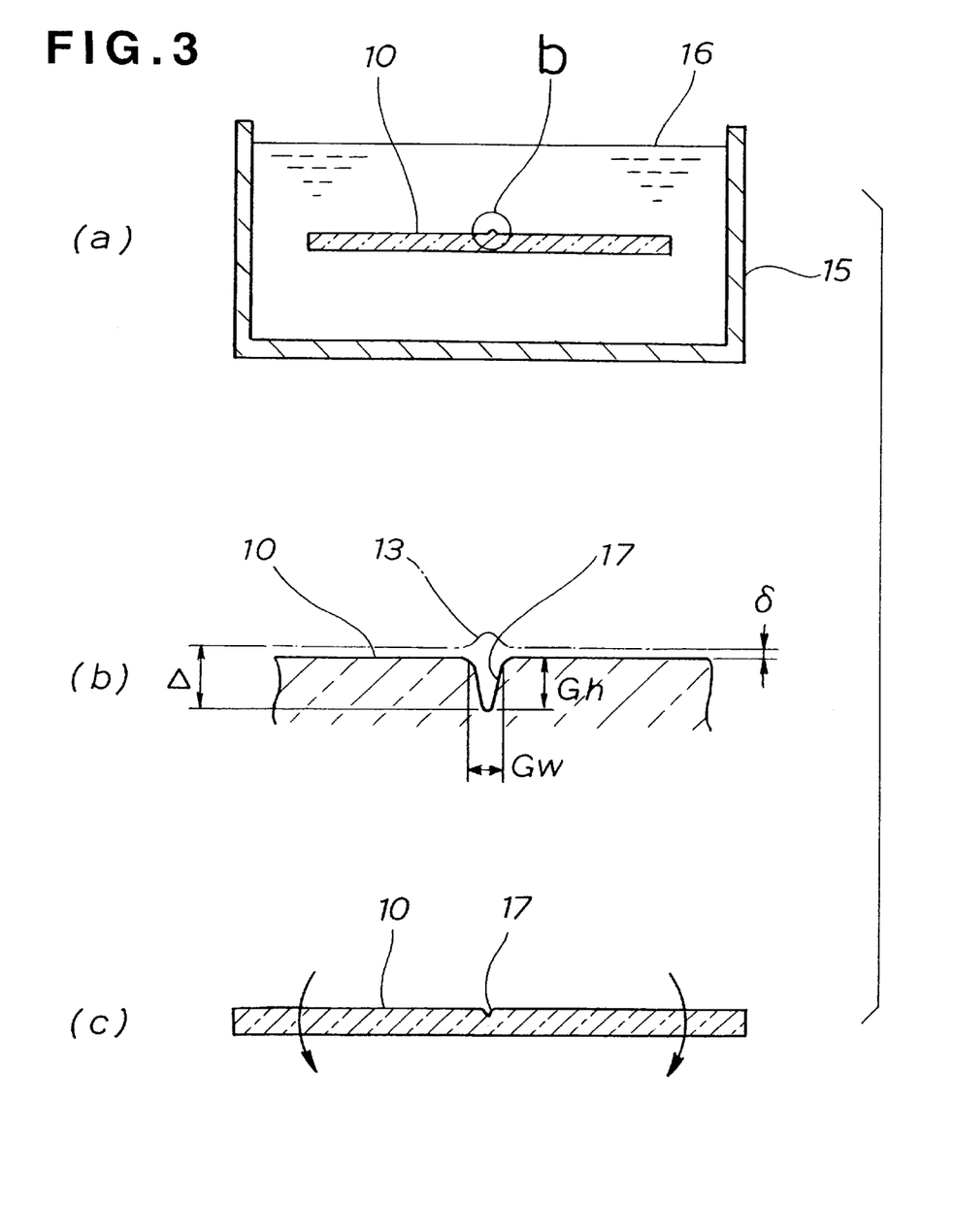
FIG. 3 is a schematic illustration of the steps of etching and breaking the sheet.

Reference is now made to (a) to (c) of FIG. 3 showing the etching and breaking steps. The sheet 10 is left to stand for a specific length of time in an etching solution 16 in a tank 15, as shown in (a) of FIG. 3. The etching solution 16 may be fluoric acid, a mixture of fluoric acid and a mineral acid (e.g. hydrochloric, sulfuric or nitric acid), a mixture of fluoric acid and ammonium fluoride, or a mixture of ammonium fluoride and a mineral acid (e.g. hydrochloric, sulfuric or nitric acid), as a fluoride has the property of dissolving glass. As ammonium fluoride has a milder etching action, a mixture thereof with a mineral acid is preferred, since it does not substantially affect any portion not heat treated. The heat-treated portion 13 is dissolved in the etching solution 18 more rapidly than the remaining portion, and is dissolved by a depth shown at $\ddot{A}$ in (b) of FIG. 3, while the remaining portion is dissolved by a smaller depth shown at $\ddot{a}$ As a result, there is formed a groove 17 having a depth Gh, a width Gw and a U-shaped or dish-shaped cross section, as shown in (b) of FIG. 3. Its depth Gh and width Gw may be about 50 and 10 microns, respectively. While the theoretical analysis of this phenomenon is difficult, it is assumed that the looser atomic arrangement of the portion having a lower density may be responsible for its faster dissolution by an acid.

If a bending force is applied to the sheet 10 as shown by arrows in (c) of FIG. 3, it is broken along its U-shaped groove 17.

Figure 4A:
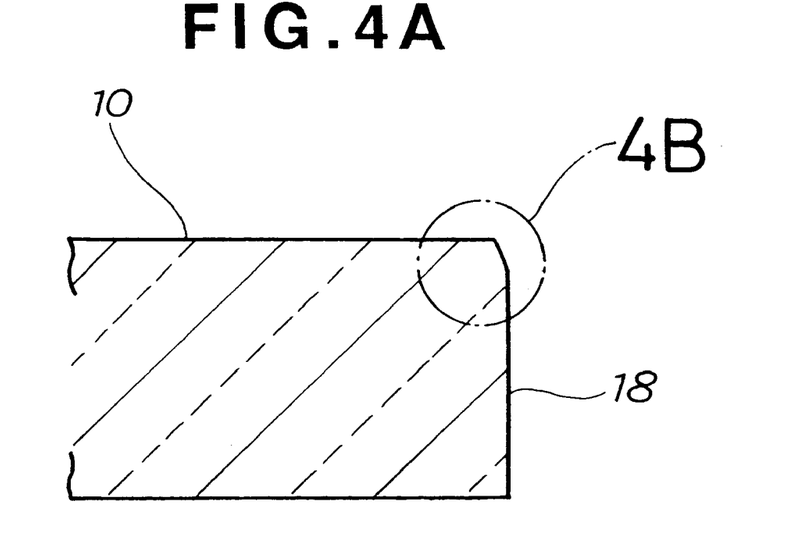
FIGS. 4A and 4B are a couple of views showing the shape of an edge on a glass sheet made by the process embodying this invention.
Figure 4B:
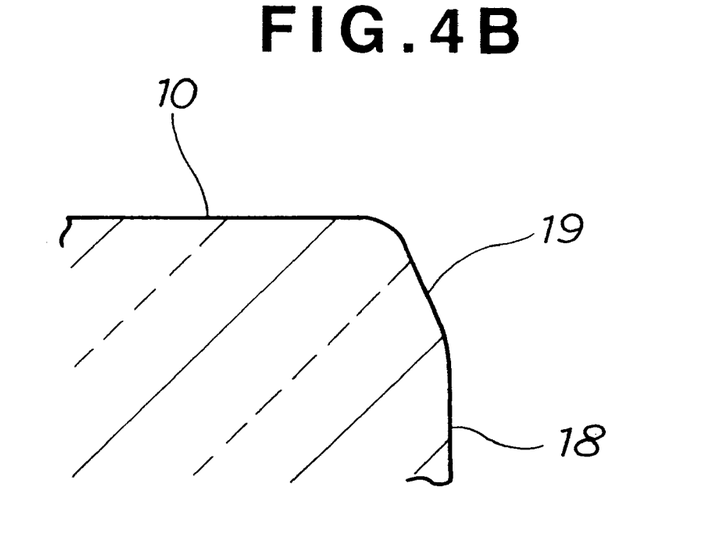

FIGS. 4A and 4B show the shape of an edge formed on a glass sheet produced by the process embodying this invention. FIG. 4A shows the whole cut surface 18. No undesirable shell-shaped chip is found on the cut surface 18, nor is any dust of glass found adhering to the surface of the sheet 10. The cut surface 18 has an upper edge defined by about a half of the U-shaped groove. It defines a beveled corner 19 between the upper surface of the sheet 10 and its cut surface 18, as is obvious from its enlargement in FIG. 4B. The beveled corner 19 has a generally rounded shape owing to the dissolving action of the etching solution. It is a very good shape which eliminates the necessity for any special beveling job that has hitherto been required.

Figure 5:
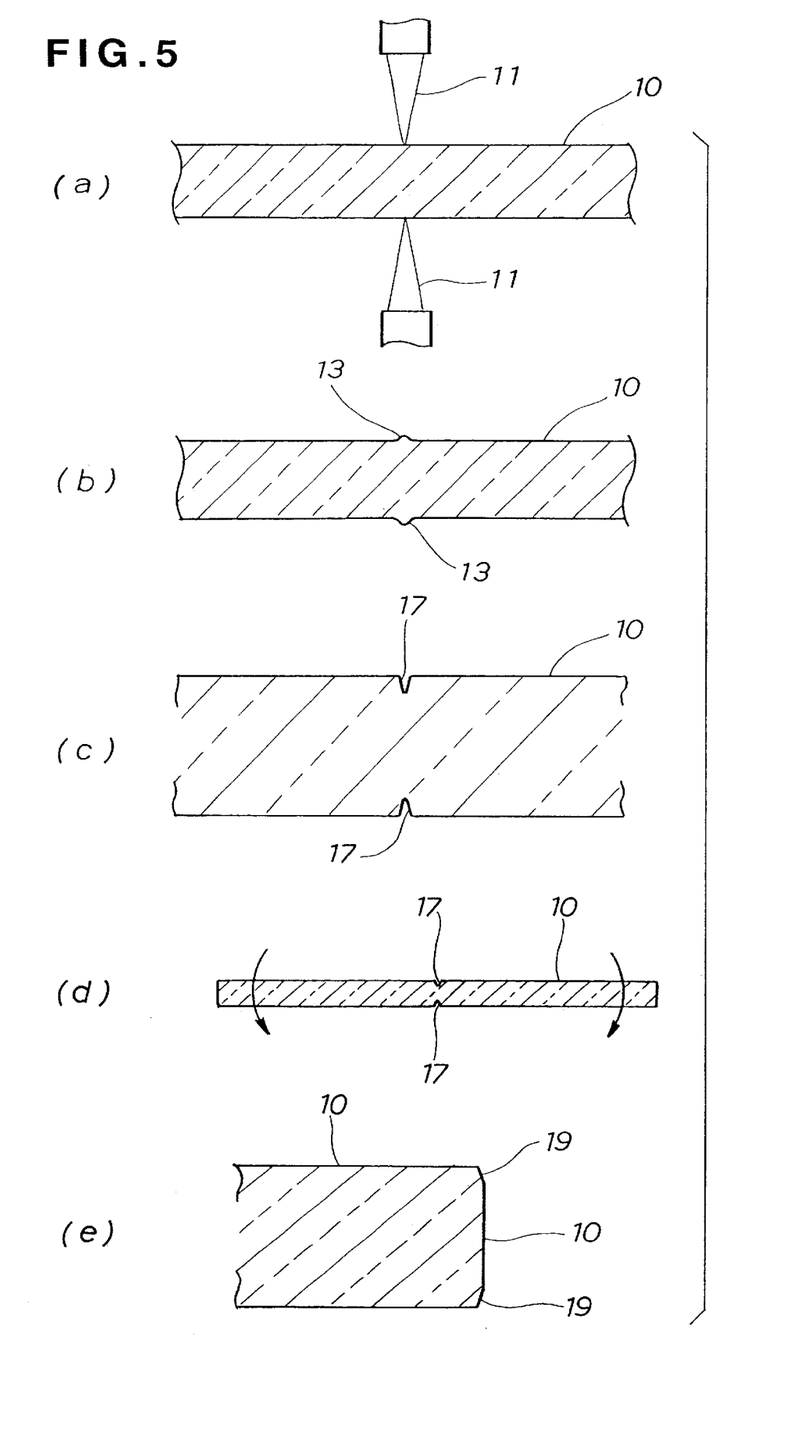
FIG. 5 is a schematic illustration of a process according to another embodiment of the present invention including the steps of forming U-shaped grooves on both sides of a glass sheet by two opposite laser beams.

A process according to another embodiment of this invention is shown in (a) to (e) of FIG. 5. Two opposite laser beams 11 are employed for heating the upper and lower surfaces of a sheet 10 of glass simultaneously, as shown in (a) of FIG. 5. As a result of its heating and cooling, there are formed two heat-treated portions 13 protruding slightly from the upper and lower surfaces, respectively, of the sheet 10, as shown in (b) of FIG. 5. As a result of etching, there are formed two U-shaped grooves 17 in the upper and lower surfaces, respectively, of the sheet 10, as shown in (c) of FIG. 5. Then, the sheet 10 is broken by bending as shown by arrows in (d) of FIG. 5. The upper and lower U-shaped grooves 17 make its breaking still easier. The two grooves 17 leave a cut surface 18 having an upper and a lower edge 19 which are both satisfactorily beveled, as shown in (e) of FIG. 5.

Figure 6:
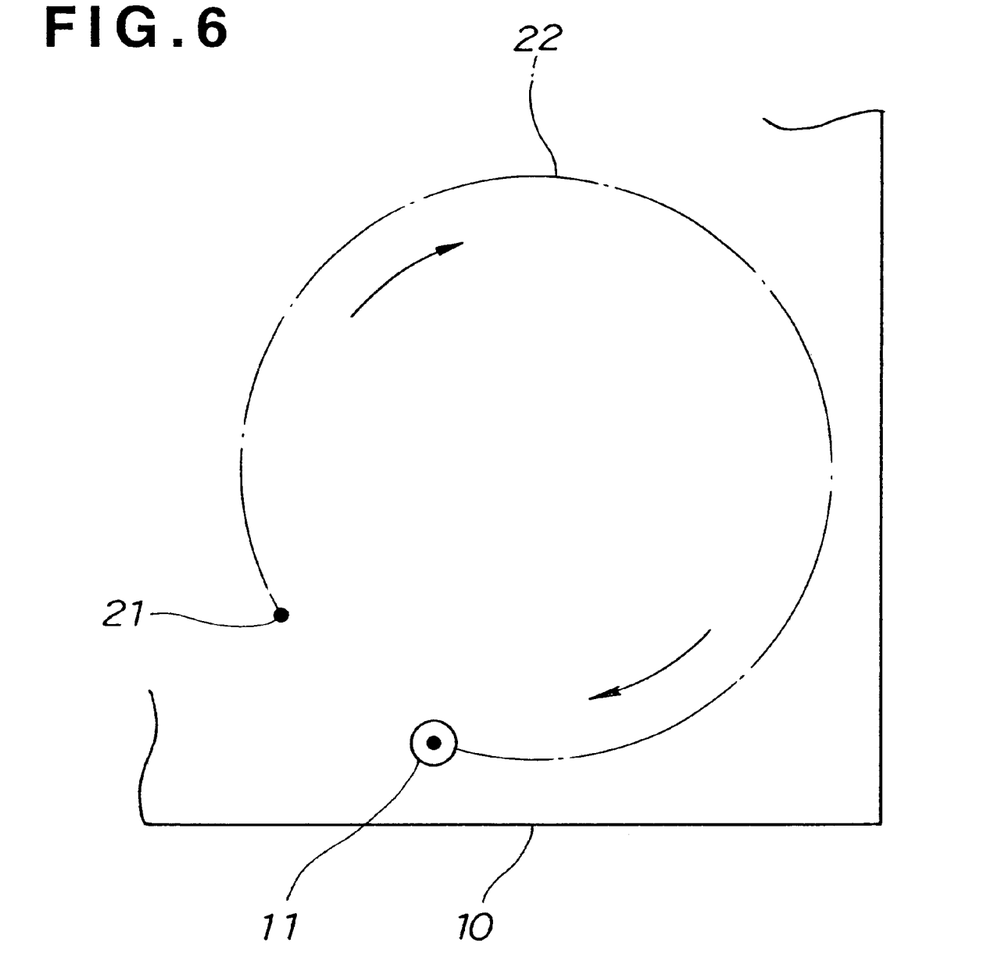
FIG. 6 is a diagram showing a process according to still another embodiment of this invention featured by a cutting line in the form of a true circle.

Referring now to FIG. 6 showing still another embodiment of this invention, a laser beam 11 is easy to control numerically so as to move on a sheet 10 of glass along an imaginary cutting line 22 in the form of a true circle from a starting point 21 to an ending point coinciding with the starting point 21. This is easy to realize by the coordinate coincidence of the starting and ending points 21. Thus, it is easy to cut an exactly circular glass disk from the sheet 10. A true circle defining the cutting line 22 is a typical closed curve drawn by a single stroke and having an ending point coinciding with its starting point. Other examples are an oval, a square and a rectangle.

Figure 7:
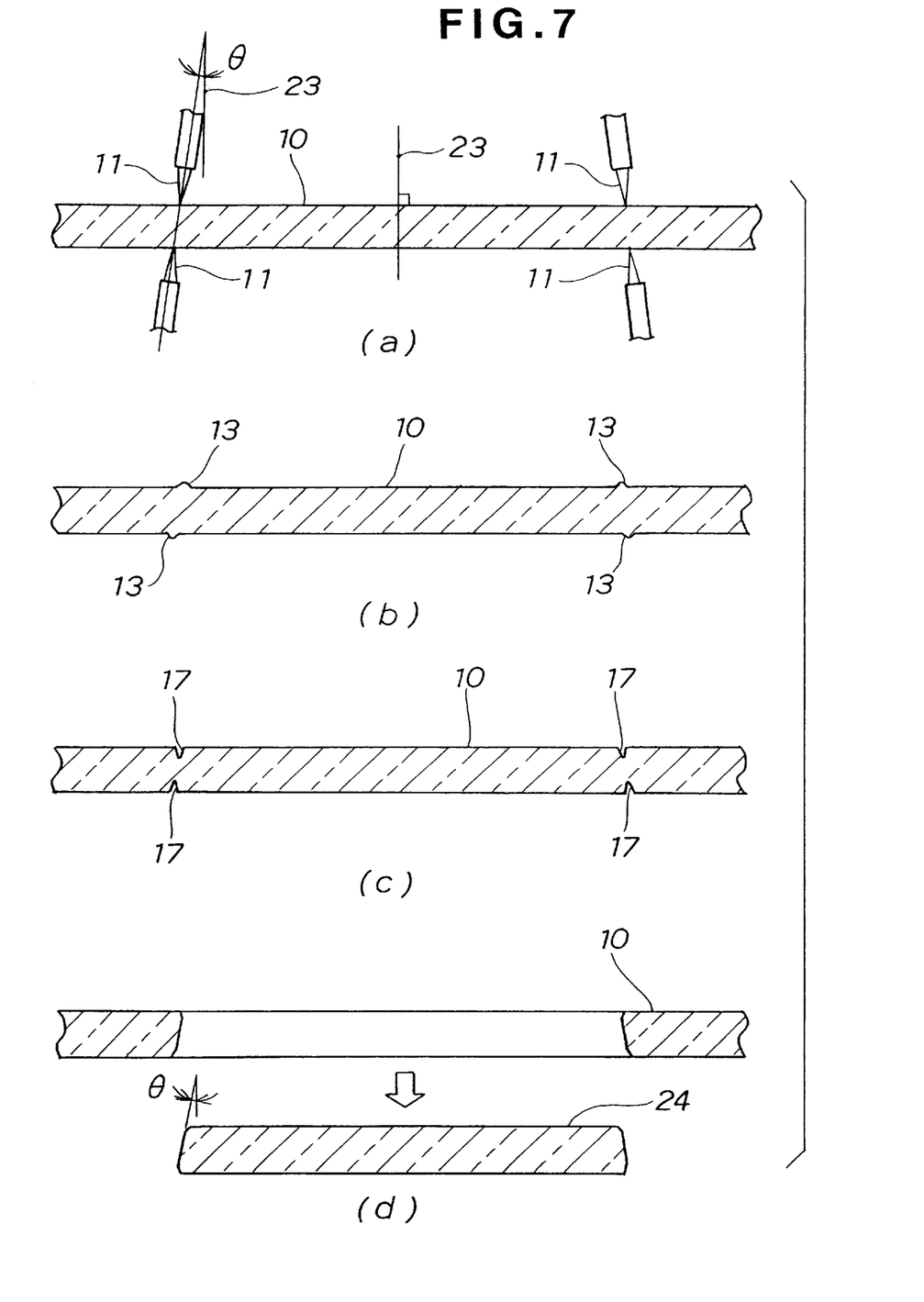
FIG. 7 is a schematic illustration of a process according to a further embodiment of the present invention featured by applying two pairs of opposite laser beams at an angle to the surfaces of a glass sheet to make a disk having a tapered peripheral surface.

A further embodiment of this invention is shown in (a) to (d) of FIG. 7. Two pairs of laser beams 11 are employed for making cutting lines on the opposite sides of a sheet 10 of glass. Each laser beam 11 has a longitudinal axis inclined at an angle è to a line 23 vertical to the upper or lower surface of the sheet 10, as shown in (a) of FIG. 7. There are formed two heat-treated portions 13 protruding from the upper and lower surfaces, respectively, of the sheet 10, as shown in (b) of FIG. 7. Two U-shaped grooves 17 are formed by etching in the upper and lower surfaces, respectively, of the sheet 10, as shown in (c) of FIG. 7. Then, a disk 24 of glass is cut out of the sheet 10, as shown by an arrow in (d) of FIG. 7. The disk 24 is easy to separate from the sheet 10, since it has a sloping circumferential surface having an angle è to the vertical line 23. Its sloping surface ensures that the disk 24 be separated without having any chipped corner by making undesirable contact with the sheet 10, though the cutting line is a closed curve.

Figure 8:
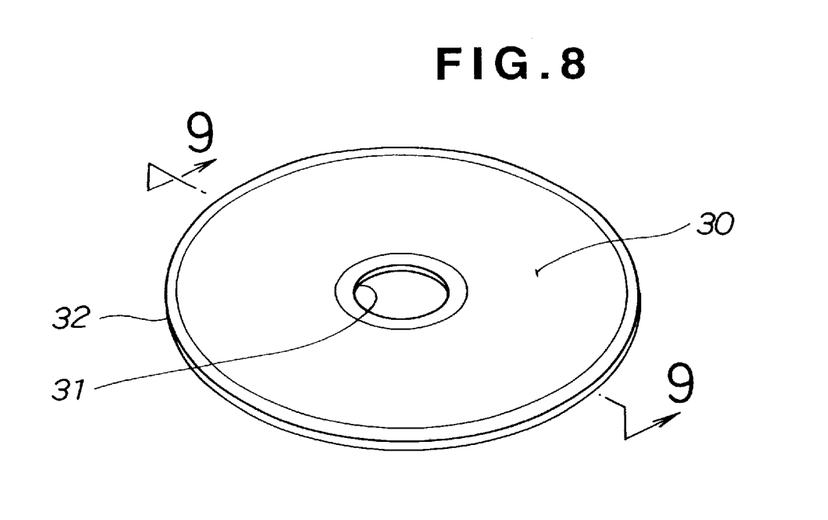
FIG. 8 is a perspective view of a glass disk embodying this invention and used for a recording medium.
Figure 9:
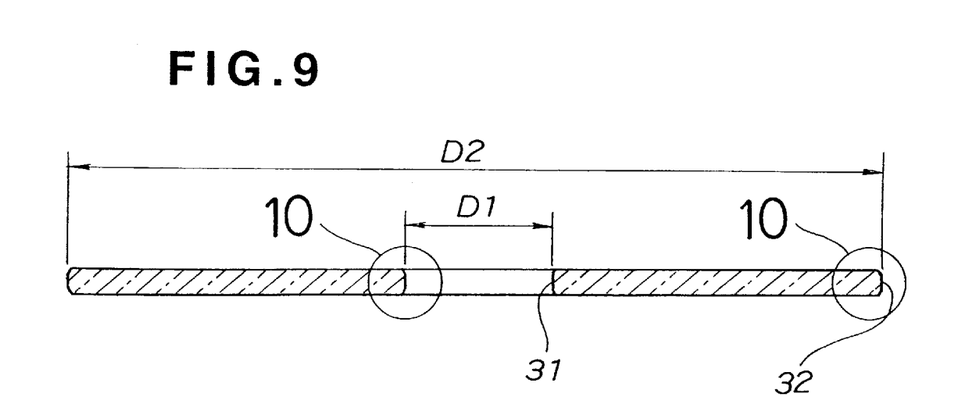
FIG. 9 is an enlarged sectional view taken along the line 9—9 in FIG. 8.
Figure 10:
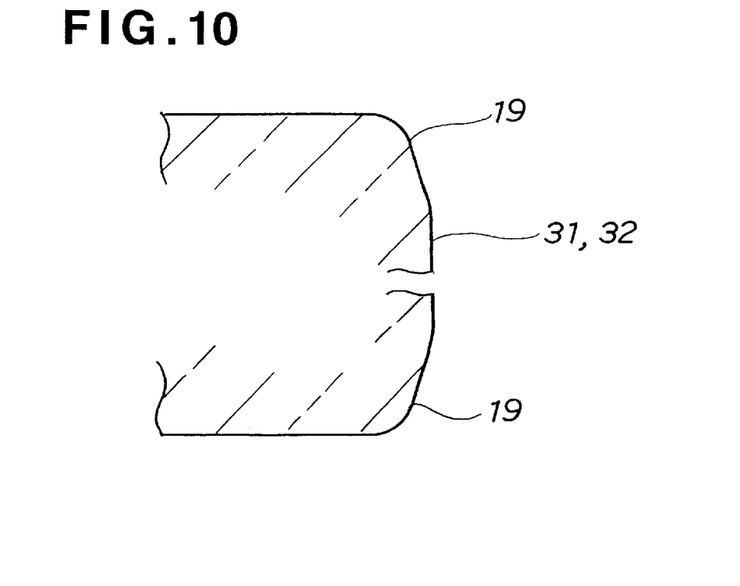
FIG. 10 is an enlarged view of a part shown at 10 in FIG. 9.

Attention is now directed to FIGS. 8 to 10 showing a glass disk embodying this invention and made by a process embodying this invention. The disk 30 is used as a base for a recording medium, such as a hard disk drive. The disk 30 has an exactly circular inner peripheral surface 31 defining an inside diameter D1 and an exactly circular outer peripheral surface 32 defining an outside diameter D2, as shown in FIG. 9. The inner and outer peripheral surfaces 31 and 32 are both beveled along two edges thereof as shown at 19 in FIG. 10. Each beveled edge is defined by a part of a U-shaped groove formed in a glass sheet by laser beam heating, cooling and etching with a solution containing fluorine, as described in detail before. The disk 30 is of glass having a linear expansion coefficient of $35 \times 10^{-7}$/deg. C or higher in a temperature range of 0 to 350 deg. C.

EXAMPLES

Description will now be made of two sets of experiments conducted for carrying out this invention, though the following description is not intended for limiting the scope of this invention. Straight cutting lines were employed in one set of experiments, and circular in the other.

Experiments Conducted by Employing Straight Cutting Lines

A total of eight experiments were conducted under different conditions from one another, and a total of 10 samples were employed for each experiment.

Glass: Soda lime silicate glass

Its linear expansion coefficient: $88 \times 10^{-7}$/deg. C (at 0 to 350° C.)

Sheet size: 30 cm by 10 cm by 1.0 mm thick

Laser beam: One

Its output: 50 to 700 mw (varying from one experiment to another)

Its diameter: 10 or 30 microns (varying from one experiment to another)

Its scanning rate: 200 to 1,000 mm/sec. (varying from one experiment to another)

Cooling: Natural

Etching solution: An aqueous solution containing 5% by weight of ammonium fluoride and 5% by weight of concentrated sulfuric acid Its temperature: 20° C.

Etching time: 3 to 5 min. (varying from one experiment to another)

Breaking: Manually along a U-shaped groove

Defects checked: Protrusion from any edge of a cut surface, and shell-shaped chipping Evaluation for defects: The results are shown in Table 1 by a circle if there was no defect found at all, by a triangle if defects were found on not more than four of the 10 samples, or by an x if defects were found on five or more samples.

Overall evaluation: The results are shown in Table 1 by a circle if the results of evaluation were acceptable on both of the two kinds of defects, or by an x if not.

TABLE 1

| Experiment No. | Laser beam output (mw) | Beam diameter (μm) | Scanning rate (mm/sec) | Etching time (min) | U-shaped groove Width (μm) | U-shaped groove Depth (μm) | Evaluation for defects Protrusion | Evaluation for defects Shell-shaped chipping | Overall evaluation |
|---|---|---|---|---|---|---|---|---|---|
| 1 | 50 | 10 | 200 | 3 | 3 | 20 | X | X | X |
| 2 | 75 | 30 | 150 | 3 | 10 | 30 | Δ | ○ | X |
| 3 | 100 | 30 | 150 | 5 | 10 | 40 | Δ | ○ | X |
| 4 | 150 | 10 | 300 | 5 | 5 | 45 | Δ | ○ | X |
| 5 | 150 | 30 | 200 | 5 | 10 | 50 | ○ | ○ | ○ |
| 6 | 300 | 30 | 300 | 5 | 20 | 100 | ○ | ○ | ○ |
| 7 | 600 | 30 | 1000 | 5 | 35 | 200 | ○ | ○ | ○ |
| 8 | 700 | 30 | 1000 | — | Broken during heat treatment | | | | X |

Table 1 shows the conditions employed for Experiments Nos. 1 to 8, the dimensions of the U-shaped grooves formed, the results of evaluation for defects on cut surfaces and the results of overall evaluation. The results of Experiments Nos. 5 to 7 were all satisfactory. It is obvious from Table 1 that it is advisable to use a laser beam having an output of 150 to 600 mw and a diameter of 30 microns, since a laser beam having an output of 700 mw or above produces an excessively large amount of thermal stress, while a laser beam having a diameter of 10 microns fails to form a U-shaped groove having a satisfactorily large depth, even if it may have an output of 150 mw. It has also been found that a U-shaped groove having a depth of 45 microns or below gives a cut surface having defects, particularly protrusions, but that a groove having a depth of at least 50 microns ensures that a glass sheet be exactly broken across its thickness and along the groove to have a good cut surface not having any protrusion or shell-shaped chipping.

Experiments Conducted by Employing Circular Cutting Lines

Glass: Soda lime silicate glass

Its linear expansion coefficient: $88 \times 10^{-7}$/deg. C (at 0 to 350° C.)

Sheet size: 150 cm by 150 cm by 1.0 mm thick

Laser beam: One

Its output: 600 mw

Its diameter: 30 μm

Its scanning rate: 1,000 mm/sec.

Cooling: Natural

Etching solution: An aqueous solution containing 5% by weight of ammonium fluoride and 5% by weight of concentrated sulfuric acid Its temperature: 20° C.

Etching time: 5 min.

Figure 11:
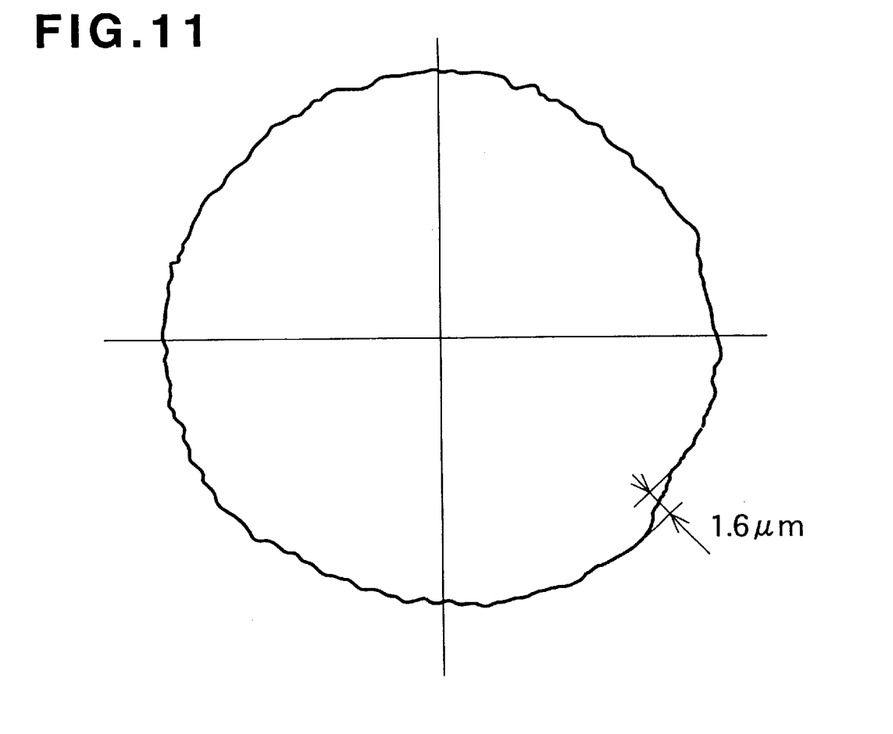
FIG. 11 is a graph showing the roundness of a glass disk as determined experimentally by cutting a sheet along a true circle.

FIG. 11 is a graph showing the roundness of the outer circumference of a glass disk as obtained under the conditions stated above. Its outside diameter was measuredly a commercially available roundness measuring instrument and showed a roundness deviation of 1.6 microns. No protrusion or shell-shaped chipping was found on its cut surface.

Comparative Case

Glass: Soda lime silicate glass

Its linear expansion coefficient: $88 \times 10^{-7}$/deg. C (at 0 to 350° C.)

Sheet size: 150 cm by 150 cm by 1.0 mm thick

Cutting: A glass sheet surface was scored, and heated by a laser beam, so that a large amount of thermal stress might be produced to sever glass, as proposed in WO93/20015, "Division of a Nonmetal".

Figure 12:
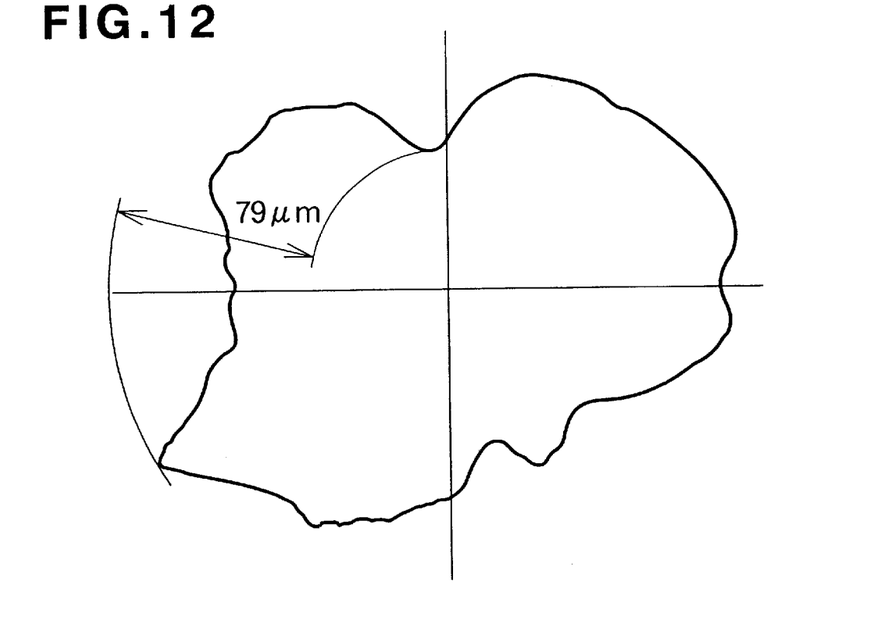
FIG. 12 is a graph showing the roundness of a disk as obtained in a comparative case.

FIG. 12 is a graph showing the roundness of the outer circumference of a glass disk as prepared under the conditions stated above. Its outside diameter was measured by a commercially available roundness measuring instrument and showed a roundness deviation of 79 microns. No protrusion or shell-shaped chipping was found on its cut surface. A sharp right-angled corner was found between the sheet surface and the cut surface, and required beveling to avoid the marked formation of sharp protrusions.

It is generally believed that a roundness deviation of 10 microns is the maximum allowable for a glass disk intended for a recording medium. In this connection, the disk prepared in accordance with this invention was quite acceptable as having a roundness deviation of only 1.6 microns, while the comparative disk having a roundness deviation of 79 microns was far from acceptable.

Obviously, various minor changes and modifications of the present invention are possible in the light of the above teaching. It is therefore to be understood that within the scope of the appended claims, the invention may be practiced otherwise than as specifically described.

What is claimed is:

1. A process for cutting a glass sheet, comprising the steps of:

heat treating a glass sheet to be cut by first applying at least one laser beam onto a surface of the glass sheet and scanning the laser beam along a cutting line along which the glass sheet is to be cut, so that a sheet portion including said cutting line may be heated to a temperature equal to, or above a glass transition point of the glass sheet, and then cooling the sheet portion to thereby cause the sheet portion to protrude from the remaining portion of the glass sheet, protruding sheet portion having a larger specific volume and a lower density than the remaining portion of the glass sheet;

etching the heat-treated sheet to form a groove in and along the sheet portion including said cutting line; and breaking the glass sheet along said groove.

2. The process according to claim 1, wherein said temperature is lower than the melting temperature of the glass sheet.

3. The process according to claim 1, wherein said cooling is forced cooling and achieved immediately after said heating.

4. The process according to claim 1, wherein said cooling employs pressurized air as a coolant.

5. The process according to claim 4, wherein said cooling employs pressurized air as a coolant.

6. The process according to claim 1, wherein said groove has a depth of at least 50 microns.

7. The process according to claim 1, wherein said etching employs an aqueous solution of acid ammonium fluoride as an etching solution.

8. The process according to claim 7, wherein said solution is prepared by mixing ammonium fluoride and sulfuric acid.

9. The process according to claim 1, wherein said sheet has a linear expansion coefficient of at least $35 \times 10^{-7}$/deg. C. at a temperature of 0 to 350 deg. C.

10. The process according to claim 1, wherein said cutting line is a closed curve having an ending point coinciding with its starting point.

11. The process according to claim 10, wherein said curve is a circle.

12. The process according to claim 10, wherein said laser beam is inclined to a line normal to said surface of the glass sheet so that said groove may present a conical, or likewise tapered surface.

13. The process according to claim 1 wherein said groove formed by said etching has a round edge at an open end thereof.

14. The process according to claim 1 wherein said groove formed by said etching has a U-shaped cross section.

15. The process according to claim 11 wherein said circle has a maximum roundness deviation of 10 $\mu$m.

* * * * *